Jan. 9, 1934.   E. A. RUTENBER   1,942,835
ELECTRICAL APPLIANCE
Filed July 8, 1930   2 Sheets-Sheet 1
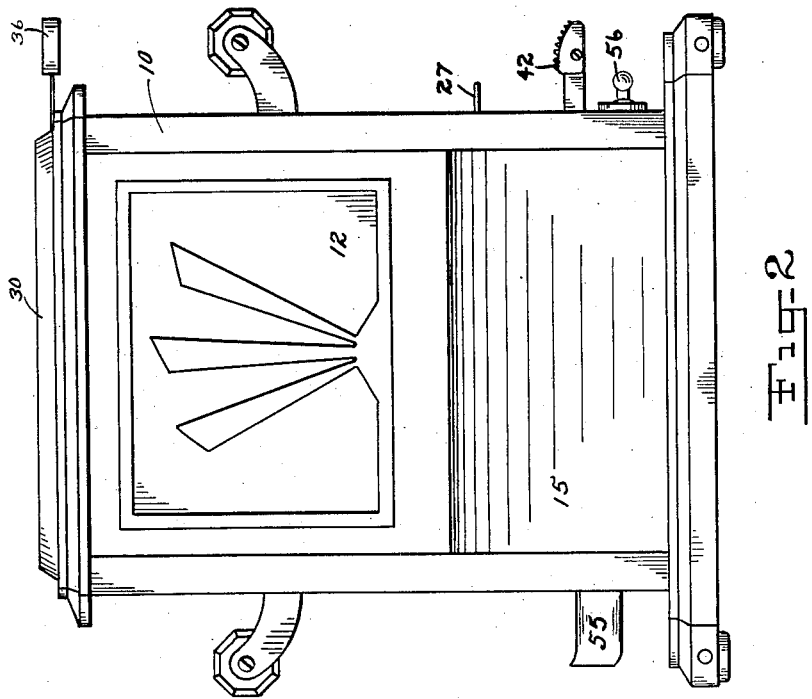
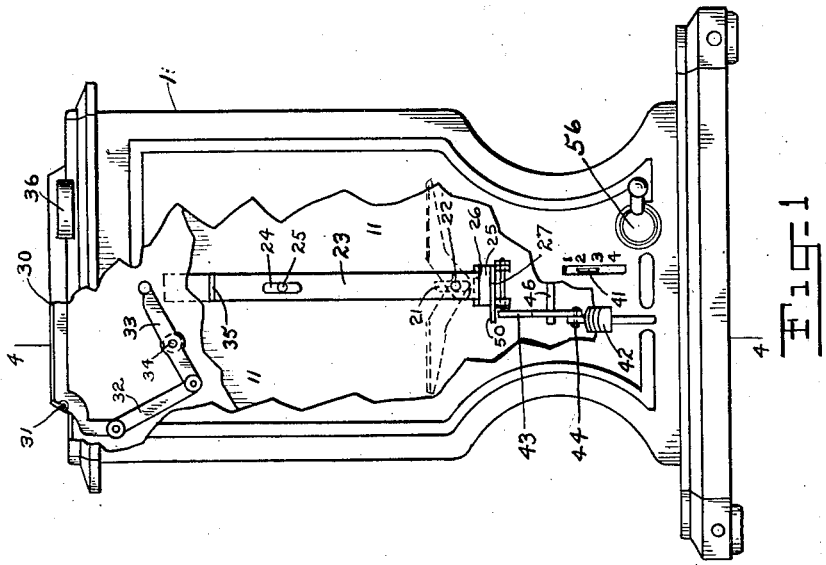
Inventor
Edwin A. Rutenber
By his Attorney
E. J. Cox.

Jan. 9, 1934.  E. A. RUTENBER  1,942,835
ELECTRICAL APPLIANCE
Filed July 8, 1930  2 Sheets-Sheet 2
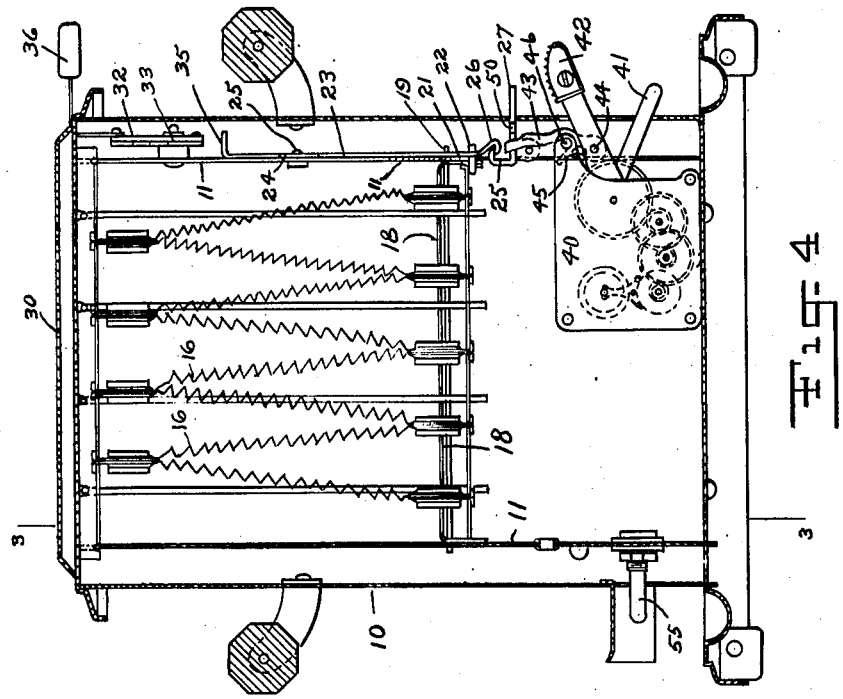
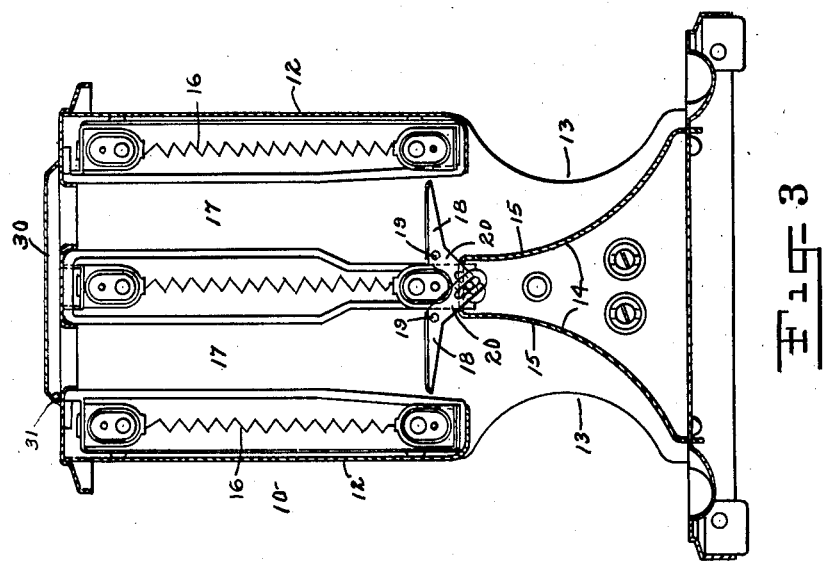
Inventor
Edwin A. Rutenber
By his Attorney
B. J. Cox Patented Jan. 9, 1934

1,942,835

UNITED STATES PATENT OFFICE 1,942,835

ELECTRICAL APPLIANCE

Edwin A. Rutenber, Milwaukee, Wis., assignor to A. J. Lindemann & Hoverson Company, Milwaukee, Wis., a corporation of Wisconsin Application July 8, 1930. Serial No. 466,386

12 Claims. (Cl. 53—5)

The present improvements relate, in general, to electrical appliances and more particularly to that type of device employed for toasting bread.

A primary object, among others, is to provide an improved toaster in which certain of the operations are automatically accomplished. A further object is the provision of a time controlled mechanism for automatically and completely freeing the toaster of the toasted slices.

Another object of the improvements is to provide a toaster wherein the toast supports are automatically set during the operation of supplying the apparatus with bread.

A still further object is the provision of automatically releasable means for permitting removal of the toasted product. The provision of a closed heating chamber as well as a plurality of separably operable releasing instrumentalities comprise further objects of the invention.

Other objects and advantages of the improvements will be apparent to those skilled in the art, upon reference to the accompanying specification and drawings, in which Fig. 1 is an end elevation of a toaster embodying the present improvements, parts being broken away for convenience in illustration;

Fig. 2 is a side elevation of the toaster;

Fig. 3 is a transverse cross section taken on line 3—3 of Fig. 4;

Fig. 4 is a longitudinal cross section taken on line 4—4 of Fig. 1.

Referring to the drawings illustrating the present embodiment, 10 designates the outer casing of a toaster formed of sheet metal which has inner casing elements 11 spaced slightly from the outer walls 10. It is notable that the side walls 12 of the casing 10 are foreshortened, as seen in Figs. 2 and 3, while the end walls 13 extend completely to the base of the toaster and serve as standards for supporting the elements suspended above the base. Projecting upwardly from the base is a two sided ramp 14 which extends the length of the casing having gradually curved sides 15 diverging from the middle of the toaster outwardly towards the base thereof. It is apparent that these curved walls are unobstructed and afford tracks by which the slices of bread may slide downwardly and outwardly through the open lower sides of the toaster (see Figs. 2 and 3).

A plurality of heating coils 16 are suitably mounted within the toaster casing and are spaced so as to provide therewith a plurality of chambers or housings 17. These elongated chambers 17 have open tops and have their bottoms in alignment with the open areas bounded by the curved surfaces 15, so that the chambers 17 are open ended housings extending through the casing.

Although the present embodiment illustrates the upper opening of these chambers as disposed in the top of the toaster, it is apparent that they may be closed at such locations and have openings in the ends of the casing so that the bread to be toasted may be inserted into the chambers laterally from the end, rather than vertically from the top, as is contemplated in the present improvements.

As aforementioned, the chambers 17 are of the size to accommodate one or more slices of bread which may be toasted by the heating element 16 associated with the chambers on each side thereof.

Means for releasably supporting the slices of bread in the chambers is provided in the mechanism now described. Bell crank levers 18 are pivotally mounted adjacent the sides of the housings 17 and have their free arms disposed within the housings. These levers, of which there may be several throughout the length of the housing, constitute bread supporting means, as will hereinafter appear. While a series of such bread supports may be provided in the nature of a grid, it is preferable that they be connected by sheet metal to form a shelf extending along the portion 17.

The levers 18 pivoted at 19 have their other arms 20 disposed adjacent one another, each having slots in register so that a common member may be disposed through a slot of each and thereby cause movement of both simultaneously.

Such a common member for operating the bread supporting means is provided in the pin 22, which projects through slot 21 in wall 11 and is fixed to slide bar 23 movably mounted on said wall. Said bar is provided with a slot 24 riding in fixed pin 25 whereby vertical movement of the bar is afforded. It is apparent therefore that when bar 23 is depressed, pin 22 riding in the slots of the bell crank levers 18 will carry the portions 20 downwardly and simultaneously elevate the bread supporting means 18 to the horizontal position illustrated in Fig. 3. However, if the bar 23 is released, the bread supporting means will drop of their own weight thereby elevating the bar with them.

A plurality of means for holding said bar in depressed position and for releasing same are provided in the present improvements. One such mechanism is most clearly seen in Fig. 4, wherein a pivoted latch 25 is disposed in alignment with the catch end 26 of bar 23, said latch having an operating member 27 projecting outwardly through a slot in the outer end wall of the casing. While the member 25 will normally repose in its illustrated position, a spring or other energized means may be provided as an auxiliary force for maintaining same releasably in the full line position in Fig. 4. It is apparent from this description, that when bar 23 is depressed, catch nose 26 will snap over and engage latch 25, whereby the bread supporting means 18 are held in horizontal position.

The toaster is provided with a closure 30 hinged at 31 so that the chambers 17 may be rendered readily accessible but at the same time may be closed off also at their upper portions, when the bread is toasting for retaining the heat, thereby contributing materially to the efficiency of the operation. This insures the retention of the heat in the chambers which are closed off at the bottoms by the closures 18 which prevent drafts or air circulation due to the close fit of the closures in the chambers. The hinged portion of the closure 30 carries a pivoted link 32 which extends downwardly between the inner and outer casing walls, and towards the center of the toaster, to which is operatively connected one end of lever 33 pivoted at 34. The free end of lever 33 projects over the flange 35 of the vertically slidable bar 23. Accordingly, upon opening of the closure by means of finger grip 36, the lever arrangement just described functions to engage and depress the bar 23. Therefore, when the upper end of the bar is in dotted line position (Fig. 1), the bread supporting means 18 are disposed downwardly and no barrier of any kind is provided adjacent the bottom of chambers 17. However, mere opening of the closure 30 for the purpose of inserting bread slices, automatically sets the members 18 in bread supporting position. This result is apparent since opening movement of the closure 30 causes lever 33 to engage and depress bar 23, which elevates the members 18 and at the same time causes catch nose 26 to snap into engagement with latch 25 whereby the supporting means 18 are held in horizontal position. The bread slices may now be inserted in the chamber 17 and will be supported there in intimate association with the heating means, whereupon the closure 30 may be closed without in any way effecting the bar 23. In this set position, the elements just described will be in the full line positions illustrated in Figs. 1 and 4.

After the bread has been sufficiently toasted, the manual lever 27 may be raised slightly, thereby releasing latch 25 from catch 26 of the bar 23. There is now no resistance holding the bread supporting means 18 in horizontal position, whereupon these toast supports automatically drop away from their position in chambers 17, with the result that the toasted slices drop downwardly and outwardly along guides 15 and appear at the lower open sides of the toaster whence they may be manually removed for use. When this automatic freeing of the chambers of the toasted bread is accomplished, the bar 23 is at its uppermost travel with its top portion in dotted line position, as seen in Fig. 1. Other slices of bread may now be inserted into the toaster by raising the closure, which operation again automatically sets the bread supporting means.

A further mechanism for automatically freeing the chambers of toasted bread, is provided in the time controlled device 40 (see Fig. 4). This device may be set by means of lever 41 projecting through a slot in the outer end wall of the casing 10. As seen in Fig. 1, the time controlled mechanism may be set for any desired interval of time necessary for producing the quality of toast desired.

Operatively associated with this timing mechanism is a lever 42 which carries lever 43 loosely pivoted thereon at 44. The lever 43 is provided with a cam 45 which rides along in engagement with fixed pin 46. As seen in Figs. 1 and 4, the upper portion of the lever 43 is disposed adjacent to the manual lever 27 having latch 25. This lever has a lateral projection 50 disposed partly in the path of travel of the end of lever 43. Accordingly, when lever 42 is depressed, cam 45 riding on pin 46 causes the lever 43 to travel downwardly and rest against the end of the toaster casing 10.

Therefore, to accomplish automatic operation of the present improvements, the lever 41 is set for the desired interval of time and lever 42 is likewise depressed. The bread slices may be inserted in the chambers 17 during which part of the operation the supporting means 18 have been automatically set and are held in position by catch 25. As the timing mechanism functions, the lever 42 gradually rises, due to the timing mechanism, to its original full line position and the upper end of lever 43 engages lateral projection 50, momentarily raising the same until vertical bar 23 is released from latch 25, whereupon the supporting means 18 fall downwardly and the toasted bread drops and appears at the open sides of the toaster. While this is transpiring, the cam 45 of lever 43 gradually rides on fixed pin 46 as levers 42 and 43 continue their upward travel, so that the latter is carried inwardly and automatically frees itself from the projection 50 on lever 27. This action permits the manual lever 27 to be free for repeating the latching operation when the closure 30 is again raised for inserting additional bread slices.

It is therefore apparent that the present improvements provide a releasable means for supporting the bread and manual, as well as automatic mechanism for releasing the releasable means. In the present embodiment, the automatic mechanism for accomplishing complete removal of the toast from the toaster, without disturbing the closure 30, is in the form of a time controlled device which ensures proper toasting, as desired, without the danger of burning same.

A marked advantage of the present improvements resides in the fact that the toaster is closed during the toasting operation so that no draft is created through same and the heat is maintained therein so that the bread is more uniformly and equally toasted. Furthermore, the fact that the bread supports are automatically set without actuating an independent lever, when the top is opened for the purpose of inserting the bread, is of marked importance and cannot be overemphasized.

Furthermore, automatic release of the toast and at the same time the automatic release of lever 43 from projection 50 after these elements have cooperated, leaves the manual control device 27 available for operation at all times, before or after the timing mechanism has performed its functions. It is apparent, therefore, that this refinement of construction permits use of the toaster at all times even though, for some reason, the timing mechanism may become impaired and useless.

It is notable that the timing feature of the improvements control the dropping out of the toast. This construction permits complete removal of the toast from the heated chambers and the toaster itself, so that no portion of the toast remains in the chamber as is common in prior devices.

The toaster is provided with the usual plug socket 55 for connection with house current through the familiar cord or other means. Before the current reaches the heating means 16, it must pass the switch 56 which is disposed in one end of the toaster and may be manually operated to turn the current on and off, as desired.

Other advantages and various modifications of the present improvements may be apparent to those skilled in the art and may be adopted without departing from the scope and purview of the invention.

It will also be seen that while the toast shelves provided by the connected levers 18 may be of wire or other open work, as stated, by forming them of sheet metal a heat-retaining substantial closure at the bottom, similar to that at the top is formed, and the efficiency of the device thus materially increased.

I claim:

1. In combination, a toaster having an open-ended chamber, a movable closure at each end thereof, one of said closures positioned for moving the other and mechanism for freeing the chamber of the toasted bread by disturbing only one closure.

2. In combination, a toaster having an open-ended toasting chamber, movable closures at the top and bottom of said chamber, movable members operatively connecting said closures whereby said top closure operates on and moves the bottom closure to closed position and means for automatically opening the bottom closure to permit gravitation of toast from said chamber without disturbing said top closure.

3. A toaster having an open ended chamber, movable closures at the top and bottom of said chamber said bottom closure being movable to and from a position across said chamber, and separate movable connections associated with said closures and positioned for engagement for affording movement of said closures in unison, said connections also affording relative movement of said closures.

4. A toaster having an open ended chamber, movable closures at the top and bottom of said chamber said bottom closure being movable to and from a position across said chamber, movable connections between said closures, said top closure being operable by means of said connections to initially set said bottom closure said connections having means for subsequently affording relative movement of said closures.

5. A bread toaster comprising a casing defining a chamber, heating means associated with said chamber, a closure for the top of said chamber, bread supporting means disposed in said chamber, mechanism operatively associated with said closure and means and operable by said closure for setting said means, and mechanism for moving said bread supporting means, after it has been set, without moving said closure.

6. A bread toaster comprising a casing defining a chamber, heating means associated with said chamber, a closure for the top of said chamber, bread supporting means movable into and out of supporting position in said chamber, mechanism including independently movable members operatively associated with said closure and means and operable by said closure for setting said means and mechanism for subsequently moving said bread supporting means out of supporting position without moving said closure.

7. A bread toaster comprising a casing defining a chamber, heating means associated with said chamber, bread supporting means movable into and out of supporting position in said chamber, mechanism for initially setting said means comprising a cover for said chamber, said mechanism having means providing relative movement of said cover and means after setting.

8. A bread toaster comprising a casing defining an open ended chamber, heating means associated with said chamber, a cover for the top of said chamber, movable bread supporting means for the bottom of said chamber said means being movable to positions both effective and ineffective for supporting bread, a releasable member for holding said means in bread supporting position, engaging members operable by said cover for moving said means into engagement with said member, said members being subsequently movable independently of each other whereby said cover may be opened and closed at will without disturbing the bread supporting means.

9. A bread toaster comprising a casing defining a plurality of open ended chambers, bread ramps associated therewith, a bread supporting shelf for the bottom of each chamber, a common member for moving said shelves to position across the bottoms of the chambers, latch means for holding said shelves in such position, a cover for said chambers, means attached to said cover and operable thereby for engaging said common member for setting said shelves, said means being free of said common member whereby said cover is afforded freedom of movement and means for tripping said latch.

10. A toaster comprising a casing defining a chamber, heating means associated with said chamber, a cover for the top of said chamber, a bread supporting shelf adjacent the lower portion of said chamber said shelf being movable to and from a bread supporting position within said chamber, an arm connected with said shelf, a second separate arm connected with said cover and movable independently of but positioned to engage said first arm for moving said shelf, and a releasable latch for securing said shelf in supporting position.

11. A bread toaster comprising a casing defining a plurality of open-ended chambers, a bread supporting closure adjacent the bottom of each chamber, a common closure for the tops of said chambers, mechanism operable by said common closure for moving said bottom closures to position across said chambers and means for holding said bottom closures in such position.

12. A toaster comprising a casing having side and end walls defining an open-ended vertical toasting compartment, an imperforate movable closure adjacent the lower end of said compartment, said closure having its extremities in close proximity to said side and end walls and forming therewith a compartment substantially closed at sides, ends and bottom for the reception of bread or the like to be toasted, and effectively excluding air therefrom at sides ends and bottom, resistance heating wires in said compartment and a movable cover extending over said compartment and forming a cover therefor, said bottom closure adapted to support bread to be toasted in said compartment, and a movable operative connection between said cover and said bottom closure whereby operation of the cover moves said closure to closed bread supporting position, and time controlled devices for regulating the movement of said closure away from such position.

EDWIN A. RUTENBER.